United States Patent
Durand

(10) Patent No.: US 11,951,577 B2
(45) Date of Patent: Apr. 9, 2024

(54) DEVICE FOR MOUNTING/DISMOUNTING A CONNECTING PIN USED FOR AN END-TO-END ASSEMBLY OF TWO FRAME ELEMENTS

(71) Applicant: MANITOWOC CRANE GROUP FRANCE, Dardilly (FR)

(72) Inventor: Hugues Durand, Satolas et Bonce (FR)

(73) Assignee: MANITOWOC CRANE GROUP FRANCE, Dardilly (FR)

( * ) Notice: Subject to any disclaimer, the term of this patent is extended or adjusted under 35 U.S.C. 154(b) by 0 days.

(21) Appl. No.: 17/987,849

(22) Filed: Nov. 15, 2022

(65) Prior Publication Data
US 2023/0150074 A1    May 18, 2023

(30) Foreign Application Priority Data

Nov. 15, 2021   (FR) ........................................ 2112044

(51) Int. Cl.
| | |
|---|---|
| *B23P 19/04* | (2006.01) |
| *B23P 19/02* | (2006.01) |
| *B25B 27/02* | (2006.01) |
| *B66C 23/28* | (2006.01) |

(52) U.S. Cl.
CPC ............. *B23P 19/04* (2013.01); *B23P 19/022* (2013.01); *B25B 27/023* (2013.01); *B66C 23/286* (2013.01)

(58) Field of Classification Search
CPC ..... B66C 23/286; B25B 27/023; B25B 27/04; Y10T 29/53848–29/53852; B23P 19/022; B23P 19/02; B23P 19/04
See application file for complete search history.

(56) References Cited

U.S. PATENT DOCUMENTS

2019/0353182 A1* 11/2019 Williamson .......... B23P 19/025

FOREIGN PATENT DOCUMENTS

| CN | 201940792 U | * | 8/2011 | |
|---|---|---|---|---|
| CN | 103894820 A | * | 7/2014 | ........... B25B 27/023 |
| DE | 9412626 U1 | * | 10/1994 | ........... B66C 23/286 |
| EP | 0484930 A1 | * | 5/1992 | ........... B25B 27/023 |
| EP | 0618047 B1 | | 1/1996 | |
| FR | 2680813 A1 | | 3/1993 | |
| FR | 2781535 A1 | | 1/2000 | |
| FR | 2901166 A1 | | 11/2007 | |
| FR | 3014509 A1 | | 6/2015 | |

OTHER PUBLICATIONS

Search Report issued in connection with FR Pat. Appl. 21/12044, dated Jun. 9, 2022.

* cited by examiner

*Primary Examiner* — Matthew P Travers
(74) *Attorney, Agent, or Firm* — Cook Alex Ltd.

(57) ABSTRACT

A mounting/dismounting device for mounting/dismounting a connecting pin used for an end-to-end assembly of two frame elements includes a mounting/dismounting rod having a longitudinal axis, a head adapted to cooperate with a screwdriver, and a rod body having a proximal portion and a threaded distal portion. The device also includes a base supporting a nut and having an abutment portion shaped to bear on one of the two frame elements, the threaded distal portion being provided to be screwed into the nut, a proximal stop mounted freely in rotation on the proximal portion of the rod body, and a bushing mounted around the rod body between the nut and the proximal stop.

24 Claims, 9 Drawing Sheets

DEVICE FOR MOUNTING/DISMOUNTING A CONNECTING PIN USED FOR AN END-TO-END ASSEMBLY OF TWO FRAME ELEMENTS

FIELD

The invention relates to a mounting/dismounting device to mount/dismount a connecting pin used for an end-to-end assembly of two frame elements of a structure.

The invention finds a preferred, and non-limiting, application for the mounting/dismounting of a connecting pin used for an end-to-end assembly of two frame elements of a crane structure, and preferably of a tower crane mast, of a crane boom or a counter-boom of a crane.

BACKGROUND

Conventionally, a tower crane mast is composed of a plurality of vertically stackable frame elements, called to be assembled together, end-to-end, during the mounting of the crane on its operating site, and to be separated from each other when dismounting the crane.

The frame elements, usually of square cross section, consist of four corner members (or vertical uprights) which are joined in pairs by lattice or triangulation structures, also called bracing, made up of diagonals and sleepers. During the vertical and end-to-end assembly of the frame elements, the ends of the corner members of two superimposed frame elements are rigidly connected to each other by connecting pins, generally associated with fish plates, as known for example from documents FR3014509A1, FR2781535A1 and FR2680813A1.

The connecting pins have enlarged heads extended by rods (often cylindrical in shape with a slightly frustoconical free termination), and they are usually tucked into the corner members from the outside to the inside. During dismounting, the connecting pins are conventionally ejected or driven out with a sledgehammer, by striking at the ends of the rods.

Patent EP0618047B1 suggests a tool for mounting/dismounting a connecting pin, implementing a pneumatic or hydraulic cylinder system. However, such a solution has the drawback of using dedicated tools, specially designed for such operations, thus limiting its use. Furthermore, it uses a hydraulic or pneumatic source connected to the tool by suitable hoses, limiting the range of use and involving risks inherent in the use of hoses liable to get stuck and increasing the load for the fitter.

SUMMARY

The invention suggests to respond to the problem of facilitating and securing the mounting/dismounting operations of the connecting pins, while offering a solution which is at once both practical and economical.

Thus, the invention suggests a mounting/dismounting device for mounting/dismounting a connecting pin used for an end-to-end assembly of two frame elements of a structure, such as for example a crane structure, this mounting/dismounting device comprising:
- a mounting/dismounting rod having a longitudinal axis, a head adapted to cooperate with a screwdriver, and a rod body having a proximal portion prolonging the head and a threaded distal portion which terminates in a free end;
- a base supporting a nut and having an abutment portion shaped to bear on any of the two frame elements, the threaded distal portion being provided to be screwed into the nut aligned on the longitudinal axis;
- a proximal stop mounted freely in rotation on the proximal portion of the rod body around the longitudinal axis;
- a bushing which is removable and mounted freely in translation along the longitudinal axis around the rod body between the nut and the proximal stop, such a bushing having a first open end and a second open end;

this mounting/dismounting device being configurable in:
- a mounting configuration in which the bushing is in abutment against the proximal stop; and
- a dismounting configuration in which the bushing is in abutment against the base or the nut.

Thus, the invention suggests a mounting/dismounting device which forms a mechanical assembly ready to be used with a screwdriver (also called power bolter) to mount/dismount the connecting pins, thus making it possible to operate with a commercial screwdriver, which is particularly economical because only the mounting/dismounting device is specially designed for such operations, whereas the actuator, namely the screwdriver, is conventional, and moreover is widely used by fitters who have to carry out numerous screwing/unscrewing operations.

In this way, the mounting and the dismounting of the connecting pin are done with the screwdriver and with the same mounting/dismounting device, but with different arrangements of the bushing depending on whether being in the mounting configuration or in the dismounting configuration. In both cases the screwdriver should simply perform screwing to carry out the operation and, once the operation is finished, it is enough to perform unscrewing to be able to remove the mounting/dismounting device.

Indeed, and as described below, the operations take place succinctly as follows, thanks to the invention:
- during mounting, the mounting/dismounting rod is screwed into the nut, so that the nut pushes the connecting pin, the rotational forces being taken up on the structure by the abutment portion of the base and the bushing being wedged between the structure and the proximal stop, thus leading to a depression of the connecting pin through the two frame elements, said connecting pin finishing its depression by entering partially inside the bushing placed on the side of the screwdriver;
- during dismounting, the mounting/dismounting rod is screwed into the nut, so that the proximal stop pushes the connecting pin, the rotational forces being taken up on the structure by the abutment portion of the base and the bushing being wedged between the structure and the nut, thus leading to extraction of the connecting pin from the two frame elements, said connecting pin finishing its release by entering partially inside the bushing placed on the side opposite that of the screwdriver.

Furthermore, the invention makes it possible to operate with a standalone battery-powered screwdriver, which avoids cable or hose problems, thus making mounting/dismounting operations safe.

It should be noted that, in the dismounting configuration, the bushing may be in abutment directly against the nut, or perhaps in abutment against the base in the alignment with the nut, so as to be in abutment against a portion of the base which is located between the nut and the bushing. In any case, in the dismounting configuration, the bushing is between the nut and the enlarged head of the connecting pin.

In an embodiment of the invention, the base comprises a support sleeve aligned on the longitudinal axis and having an open proximal end and an open distal end facing each other, this support sleeve internally supporting the nut, and wherein:

in the mounting configuration, the nut is blocked in rotation and is guided in translation along the longitudinal axis;

in the dismounting configuration, the nut is blocked in rotation and is blocked in translation along the longitudinal axis.

In this embodiment, the nut is movable between two distinct configurations, since during the mounting phase, it is the nut that moves axially along the longitudinal axis while the screwdriver remains axially fixed, whereas during the mounting phase it is the screwdriver which moves axially along the longitudinal axis while the nut remains axially fixed.

According to one possibility, at least one longitudinal groove is provided on the support sleeve, this longitudinal groove extending parallel to the longitudinal axis, and the nut is secured to at least one guide pin which, in the mounting configuration, is engaged in the corresponding longitudinal groove to block the nut in rotation and to guide the nut in translation along the longitudinal axis.

In this way, the nut can slide along the longitudinal groove, or longitudinal grooves, during mounting as the mounting/dismounting rod is screwed into the nut.

According to another possibility, the at least one longitudinal groove is prolonged, on the side of the open distal end of the support sleeve, by a circumferential groove which is followed by a locking groove having a generally "L" shape so that, in the dismounting configuration, the at least one guide pin is engaged in the locking groove to block the nut in rotation and in translation along the longitudinal axis.

Thus, when the guide pin is trapped in the bottom of the locking groove, it is blocked in rotation (possibly with an angular tolerance) and blocked in longitudinal translation, to allow the dismounting operation.

According to another possibility, the base comprises a proximal wall, secured to the proximal end of the support sleeve, such a proximal wall having a bearing relief which forms the abutment portion shaped to bear on any of the two frame elements.

Thus, bearing, and therefore taking up the rotational forces, on the structure is performed at the level of the proximal wall and therefore of the bearing relief.

Advantageously, the bearing relief is in the form of two linear stops facing each other, delimiting therebetween a notch into which the proximal end of the support sleeve opens.

This notch is sized to embed one of the two frame elements, and thus get trapped on the latter to block the base in rotation. It is of course possible to provide other types of bearing relief, such as for example a cantilever arm which will abut laterally on one of the two frame elements and thus block the base in rotation during the mounting/dismounting rod screwing phases.

According to another possibility, the base comprises a holding system mounted on the distal end of the support sleeve and cooperating with the free end of the rod body of the mounting/dismounting rod in the mounting configuration, to axially block the rod body along the longitudinal axis.

This holding system, which may for example take the form of a mechanical lock (such as a holding clip) has the function of holding the support sleeve (and therefore the base) on the mounting/dismounting rod during the mounting phase, the nut moving for its part inside the support sleeve which remains fixed.

According to another possibility, the base comprises one or several magnets disposed on the abutment portion for holding the base by magnetization on one of the two frame elements.

It is thus possible to provide one or several magnets on the abutment portion (or on the bearing relief described above), in order to allow the holding by magnetization of the base on one of the two frame elements, which also ensures that the base is held in place on the mounting/dismounting rod.

In one variant, the base comprises a cradle having a generally arched shape and provided with a proximal plate and a distal plate facing each other and connected by a spar, this spar forming the abutment portion shaped to bear on one of the two frame elements.

In this variant, the rotational forces are taken up at the level of the spar, which extends between the proximal plate and the distal plate which are arranged on either side of the two frame elements, and therefore on either side of the connecting pin.

According to one possibility, the proximal plate and the distal plate respectively comprise a proximal orifice and a distal orifice aligned on the longitudinal axis, this distal orifice being secured to the nut, and wherein the proximal stop and the bushing are adapted to pass inside the proximal orifice of the cradle.

According to another possibility, the proximal plate of the cradle supports a proximal tube internally defining the proximal orifice, the proximal stop and the bushing being adapted to slide inside said proximal tube.

This proximal tube thus forms an axial guide, for both the bushing (in the mounting configuration) and for the proximal stop, thus guiding the phase for screwing the mounting/dismounting rod.

According to another possibility, the distal plate supports, on an internal face opposite the proximal plate, a crown surrounding the proximal orifice and which is adapted to receive internally either an enlarged head of the connecting pin in the mounting configuration, or the open second end of the bushing in the dismounting configuration.

Such a crown makes it possible to block the connecting pin or the bushing radially, depending on whether being in a mounting or a dismounting operation. This crown, which may be attached to the nut, thus acts as a guide for the connecting pin during mounting and for the bushing during dismounting.

According to one feature, the bushing is secured to a radial extension arm adapted to be engaged in a window formed in the spar of the cradle, in order to block said bushing in rotation.

Such a radial extension arm thus provides torque recovery at the bushing.

According to another feature, the radial extension arm is provided with a free end cooperating with a locking member, such as a pin, to lock the radial extension arm in the window of the spar.

Thus, this locking member makes it possible to prevent the sleeve from falling, in particular during dismounting.

In a particular embodiment, the proximal stop is blocked in translation along the proximal portion of the rod body, against the head of the mounting/dismounting rod.

According to another possibility, the proximal portion of the rod body has a circumferential recess, and the proximal stop is blocked in translation by means of two pins which pass through said proximal stop to be engaged in the circumferential recess, for example in a diametrically opposite manner relative to the longitudinal axis.

Such pins make it possible to secure the proximal stop, without preventing the rotation of the rod body (preferably without friction due to play in the circumferential recess), and they also make it possible to remove the proximal stop if the latter is trapped in the structure.

In a particular embodiment, the proximal stop is guided in rotation by a running gear mounted around the proximal portion of the rod body.

Advantageously, the running gear is interposed between an annular stop, which bears against the head of the mounting/dismounting rod, and an inner shoulder provided in the proximal stop.

According to one feature, the annular stop has a concave rear face of hemispherical shape and which bears on a hemispherical bearing surface of the head of the mounting/dismounting rod.

The invention also relates to a mounting/dismounting system for mounting/dismounting a connecting pin used for an end-to-end assembly of two frame elements of a structure, such as a crane structure, this mounting/dismounting system comprising:
  a mounting/dismounting device according to the invention; and
  a screwdriver, for example an impact driver, equipped with a bit capable of cooperating with the head of the mounting/dismounting rod, in order to be able to rotatably drive said mounting/dismounting rod.

The invention also concerns an assembly kit for an end-to-end assembly of two frame elements of a structure, such as a crane structure, this assembly kit comprising:
  a mounting/dismounting device according to the invention; and
  at least one connecting pin adapted to pass through connecting holes provided in the two superimposed frame elements;
  wherein the connecting pin has a tubular shape so that the mounting/dismounting rod can pass through it, and the connecting pin has an enlarged head.

According to one possibility, the first open end of the bushing is sized to allow the connecting pin to enter at least partially inside the bushing, in a first direction of insertion with the proximal end of the connecting pin which enters into the first open end of the bushing, and also in a second direction of insertion with the distal end and the enlarged head of the connecting pin entering the first open end of the bushing.

The invention also relates to a mounting method for mounting a connecting pin used for an end-to-end assembly of two frame elements of a structure, such as a crane structure, said assembly method comprising providing a mounting/dismounting device according to the invention wherein:
  the connecting pin, of tubular shape, is positioned in a connecting hole passing through the two superimposed frame elements, and this connecting pin has a distal end provided with an enlarged head and a proximal end which are opposite to each other, said enlarged head being disposed on a first side of the structure, for example an outer side;
  the bushing is mounted around the rod body, on a second side of the structure, opposite to the first side of the structure, while its second open end is placed in abutment against the proximal stop;
  the base is placed on the structure with the nut being disposed on the first side of the structure in alignment with the connecting pin, the enlarged head of which is placed in abutment against the nut or the base;
  the mounting/dismounting rod is pressed and passes through the two frame elements and the connecting pin until the threaded distal portion comes into contact with the nut supported by the base, and the bushing is in contact with one of the two frame elements on the second side of the structure;
  the head of the mounting/dismounting rod is coupled to an bit of a screwdriver, for example an impact driver, which is located on the second side of the structure;
  the screwdriver is activated to screw the threaded distal portion into the nut, leading to an axial displacement of the nut in a direction from the first side towards the second side of the structure, and therefore also to an axial displacement of the connecting pin which is engaged through the two frame elements, and wherein during screwing the abutment portion of the base bears against one of the two frame elements in order to block the base and the nut in rotation;
  once the enlarged head of the connecting pin is in abutment against one of the two frame elements, the screwdriver is activated in the opposite direction to unscrew the threaded distal portion out of the nut and then remove the mounting/dismounting device.

The invention also relates to a dismounting method to dismount a connecting pin used for an end-to-end assembly of two frame elements of a structure, such as a crane structure, said dismounting method comprising providing a mounting/dismounting device according to the invention, wherein:
  the connecting pin, of tubular shape, is mounted through the two superimposed frame elements in order to assemble them, and this connecting pin has a distal end provided with an enlarged head and a proximal end, which are opposite to each other, said enlarged head being disposed on a first side of the structure, for example an outer side;
  the base is set up on the structure with the nut being disposed on the first side of the structure in alignment with the connecting pin, and with the sleeve which is mounted on the base, on the first side of the structure, and which is interposed between the nut and one of the two frame elements, the first open end of the bushing surrounding the enlarged head of the connecting pin;
  the mounting/dismounting rod is pressed and passes through the connecting pin and the bushing until the threaded distal portion comes into contact with the nut;
  the head of the mounting/dismounting rod is coupled to a bit of a screwdriver, for example an impact driver, which is located on a second side of the structure, opposite the first side of the structure;
  the screwdriver is activated to screw the threaded distal portion into the nut, leading to an axial displacement of the proximal stop which comes into abutment against the proximal end of the connecting pin, thus pushing the connecting pin axially in one direction from the second side towards the first side of the structure, so that the connecting pin comes out at least partially from the two frame elements while entering inside the bushing;
  once the proximal stop is in abutment against one of the two frame elements, the screwdriver is activated in the opposite direction to unscrew the threaded distal portion from the nut and then remove the mounting/dismounting device.

BRIEF DESCRIPTION OF THE DRAWINGS

Other features and advantages of the present invention will become apparent upon reading the detailed description hereinafter of two non-limiting examples of implementation, made with reference to the appended figures in which.

DESCRIPTION

Figure 1:
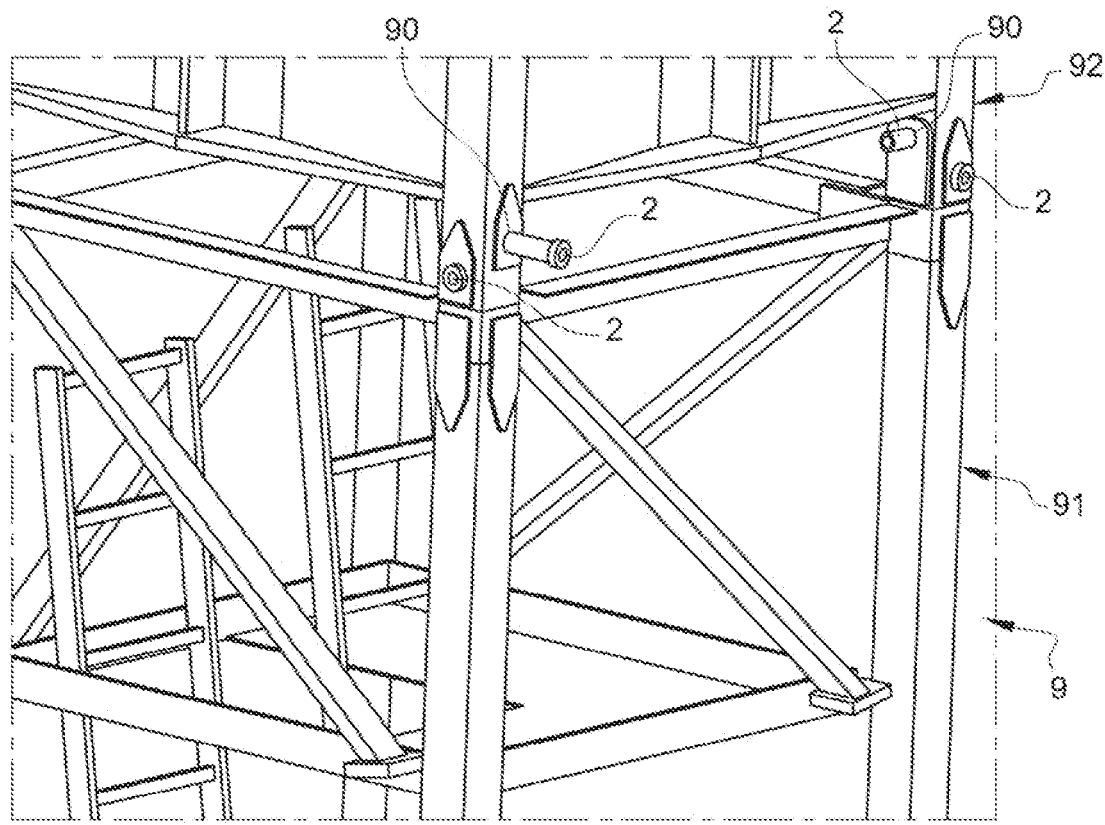
FIG. 1 is a schematic perspective view of two frame elements of a crane structure, in this case a mast element and a fixed pivot element, with an illustration of connecting pins allowing their assembly.

FIGS. 2 to 5 and 7 to 13 relate to a first mounting/dismounting device 11 in accordance with the invention, FIGS. 14 to 18 relate to a second mounting/dismounting device 12 in accordance with the invention and FIGS. 19 to 26 relate to a third mounting/dismounting device 13 according to the invention. For the rest of the description, the same reference numerals will generally be used for the structural or functional elements which are identical or similar in the three mounting/dismounting devices 11, 12, 13.

Each of the mounting/dismounting devices 11, 12, 13 has the function of making it possible to mount/dismount a connecting pin 2 used for an end-to-end assembly of two frame elements 91, 92 of a structure 9, such as a crane structure. As described in more detail below, each of the mounting/dismounting devices 11, 12, 13 is configurable reversibly between two distinct configurations:
- a mounting configuration used when mounting the connecting pin 2; and
- a dismounting configuration used when dismounting the connecting pin 2;
- so that an operator adapts the configuration according to the need.

FIG. 1 illustrates an example of a structure 9 which is in the form of a vertical structure, such as a mast (also called a tower or pylon) of a component assembly crane or a tower crane. One of the two frame elements 91, the one below, is a mast element which comprises corner members (or vertical uprights) which are joined in pairs by lattice or triangulation structures made up of diagonals and sleepers. The other of the two frame elements 92 is a portion forming a fixed pivot, placed above the frame element 91 and therefore at the top of the mast, wherein this frame element 92 also comprises corner members (or vertical uprights).

During the vertical and end-to-end assembly of the two frame elements 91, 92, the upper ends of the corner members of the frame element 91 and the lower ends of the corner members of the frame element 92 are superimposed and are rigidly connected to each other by connecting pins 2, with for example two connecting pins 2 for each pair of superimposed corner members.

Figure 6:
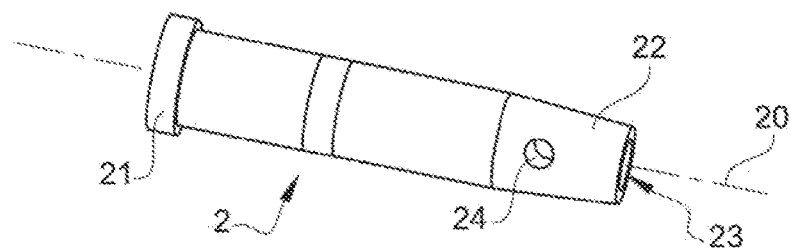
FIG. 6 is a schematic view of a connecting pin suitable for the invention.

FIG. 6 illustrates an example of a connecting pin 2 which is adapted for each of the three mounting/dismounting devices 11, 12, 13. Such a connecting pin 2 has a tubular shape, centered on a main axis 20, and it has a distal end provided with an enlarged head 21 and a proximal end 22 which are opposite to each other. Due to its tubular shape, the connecting pin 2 has over its entire length an inner channel 23 which opens into both the enlarged head 21 and the proximal end 22. The proximal end 22 may have a frustoconical shape, and the connecting pin 2 may have a cylindrical shape between the enlarged head 21 and the proximal end 22. A transverse hole 24 may be provided at the level of the proximal end 22 to allow the passage of a safety stud. This hollow connecting pin 2 is made of a metallic material, for example of steel.

During its assembly, the connecting pin 2 is inserted into a connecting hole 90 which passes through the two superimposed frame elements 91, 92, wherein it is the proximal end 22 of the connecting pin 2 which enters first. The connecting pin 2 is mounted when the enlarged head 21 comes into abutment against one of the two frame elements 91, 92. During mounting, the connecting pin 2 is inserted from a first side of the structure 9, for example an outer side in the example of FIG. 1, so that at the end of mounting the enlarged head 21 is disposed on this first side of the structure 9, while the proximal end 22 protrudes on a second side of the structure 9, opposite the first side, this second side therefore being an inner side in the example of FIG. 1. Thus, in the example of FIG. 1, the connecting pin 2 is inserted from the outside towards the inside; while being noted that alternatively it is possible to insert the connecting pin 2 from the inside to the outside. The first side and the second side are defined with respect to the axis of the connecting hole 90, and are disposed on either side of the two frame elements 91, 92 along this axis of the connecting hole 90.

Figure 7:
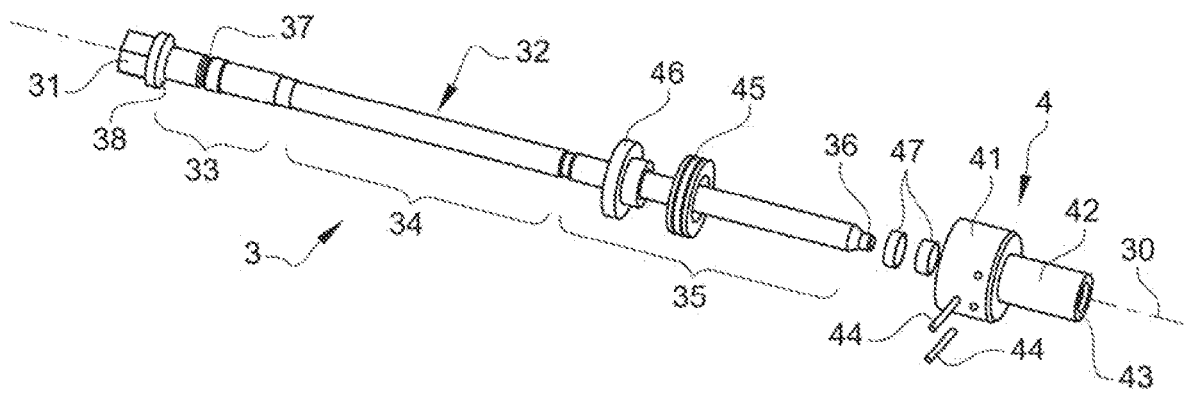
FIG. 7 is a schematic perspective and exploded view of an assembly comprising a mounting/dismounting rod, an annular stop, a running gear and a proximal stop, for the first mounting/dismounting device, and also for the second and third mounting/dismounting devices.
Figure 8:
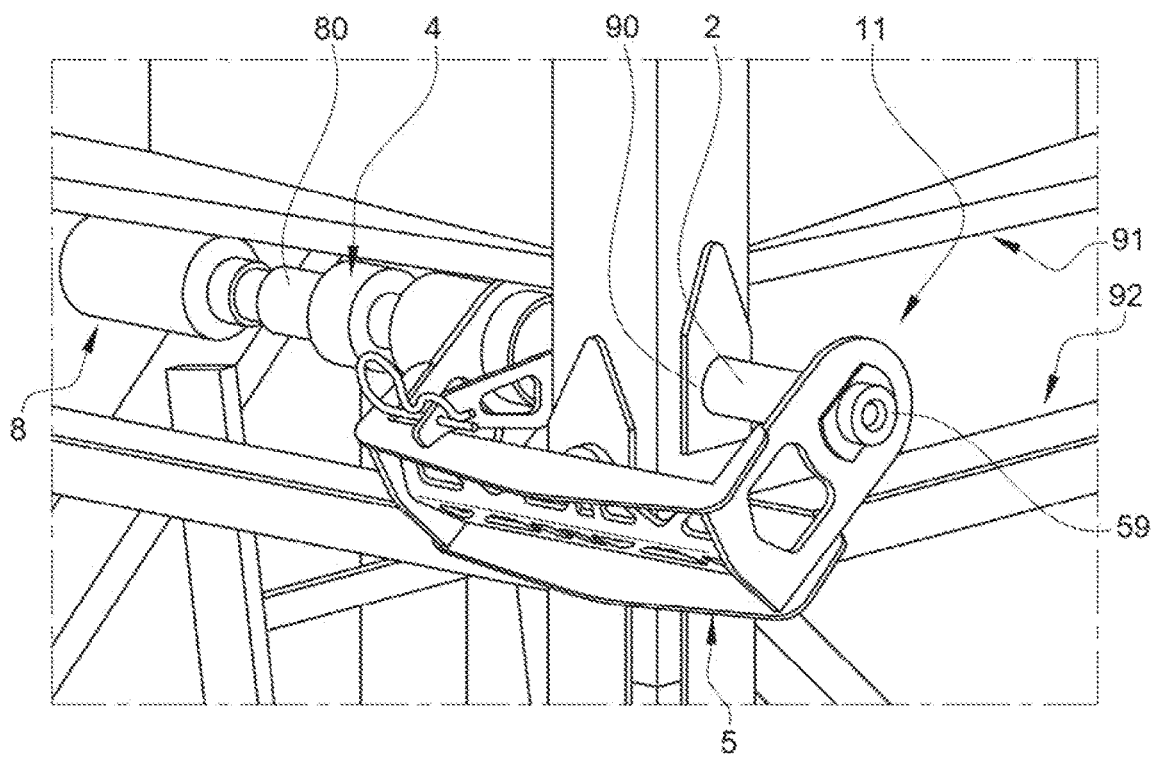
FIG. 8 is a schematic perspective view of the first mounting/dismounting device, in the mounting configuration, coupled to the screwdriver, and in position on the structure of FIG. 1.

Each of the mounting/dismounting devices 11, 12, 13 comprises a mounting/dismounting rod 3 which is illustrated alone in FIG. 7. This mounting/dismounting rod 2 is suitable for the three mounting/dismounting devices 11, 12, 13.

This mounting/dismounting rod 3 has a longitudinal axis 30, which will be the reference axis in the following description, and which defines the length of the mounting/dismounting rod 3. In situation, this longitudinal axis 30 is coincident or substantially coincident with the axis of the connecting hole 90 inside which the connecting pin 2 is inserted, and therefore this longitudinal axis 30 is also coincident or substantially coincident with the main axis 20 of the connecting pin 2.

This mounting/dismounting rod 3 has a head 31 adapted to cooperate with a screwdriver 8, and a rod body 32 successively having along the longitudinal axis 30:
  a proximal portion 33 prolonging the head 31;
  a smooth central portion 34; and
  a threaded distal portion 35 which terminated in a free end 36.

The proximal portion 33 has a circumferential recess 37, axially offset with respect to the head 31. The head 31 is shaped to be coupled to a bit 80 of the screwdriver 8, for example by shape cooperation, so that the screwdriver 8 may rotatably drive the mounting/dismounting rod 3 around the longitudinal axis 30. The head 31 is for example in the form of a hexagonal head, and the bit 80 of the screwdriver 8 is in the form of a hollow hexagonal bit. In the event of failure of the screwdriver 8, it will thus be possible to use a manual wrench to turn the mounting/dismounting rod 3.

The mounting/dismounting rod 3 is adapted to slide inside the connecting pin 2, in its inner channel 23, and even to pass right through, over its entire length, the connecting pin 2; the free end 36 of the mounting/dismounting rod 3 entering first the inner channel 23.

Each of the mounting/dismounting devices 11, 12, 13 also comprises a proximal stop 4 mounted free in rotation on the proximal portion 33 of the rod body 32 around the longitudinal axis 30. The proximal stop 4 is blocked in translation along of the proximal portion 33 of the rod body 32, against the head 31 of the mounting/dismounting rod 3. In other words, the proximal stop 4 remains in place against the head 31 and may only rotate.

The rod body 32 is passing through the proximal stop 4 over its entire length, and the proximal stop 4 has a distal end 43 forming a stopper as described below. This proximal stop 4 comprises a cylindrical proximal section 41 abutting against the head 31, and a cylindrical distal section 42 which prolongs the proximal section 41 and which terminates in the distal end 43. The distal section 42 has a diameter smaller than that of the proximal section 41.

The proximal stop 4 is blocked in translation by means of two straight pins 44 which pass through the proximal stop 4, and more precisely the proximal section 41, to be engaged in the circumferential recess 37 of the proximal portion 33 of the rod body 32, in diametrically opposite manner with respect to the longitudinal axis 30.

Furthermore, the proximal stop 4 is guided in rotation by a running gear 45, such as a roller thrust bearing, a ball thrust bearing or a needle thrust bearing, wherein this running gear 45 is mounted around the proximal portion 33 of the rod body 32, inside an internal bearing provided in the proximal stop 4, and more precisely in the proximal section 41. This running gear 45 makes it possible to reduce the friction between the proximal stop 4 and the mounting/dismounting 3 when it rotates.

This running gear 45 is interposed between an annular stop 46, such as for example a spherical thrust bearing, which bears against the head 31 of the mounting/dismounting rod 3, and an inner shoulder provided in the internal bearing of the proximal stop 4. This annular stop 46 has a concave rear face of hemispherical shape and which bears on a hemispherical bearing surface 38 of the head 31 of the mounting/dismounting rod 3.

One or two anti-friction bearing(s) 47 may also be interposed between the distal section 42 and the proximal portion 33 of the rod body 32, to reduce friction.

The pins 44 thus make it possible to secure the proximal stop 4, the running gear 45 and the annular stop 46, without preventing the rotation of the mounting/dismounting rod 3, because the pins 44 are mounted with a clearance in the circumferential recess 37. These pins 44 also make it possible to remove the proximal stop 4 if the latter is trapped in the structure 9.

Each of the mounting/dismounting devices 11, 12, 13 comprises a base 5, 6 supporting a nut 59, 69 and having an abutment portion shaped to bear on one of the two frame elements 91, 92. In situation, the threaded distal portion 35 of the rod body 32 of the mounting/dismounting rod 3 is designed to be screwed into the nut 59, 69 which is aligned with the longitudinal axis 30.

There are differences between the bases 5, 6 of the different mounting/dismounting devices 11, 12, 13: the first mounting/dismounting device 11 and the second mounting/dismounting device 12 each comprise a base 5 which extends from either side of the two frame elements 91, 92, on both the first side and the second side of the structure 9, while the third mounting/dismounting device 13 comprises a base 6 which is disposed only on the first side of the structure 9.

In the first mounting/dismounting device 11 and in the second mounting/dismounting device 12, the base 5 comprises a cradle 50 having a generally arched shape and which is provided with a proximal plate 51 and a distal plate 52 facing each other and connected by a spar 53, this spar 53 forming the abutment portion shaped to bear laterally on one of the two frame elements 91, 92 and ensure a take-up of rotational forces.

The proximal plate 51 supports a proximal tube 54 internally defining a proximal orifice 55, and the distal plate 52 comprises a distal orifice 56 integral with the nut 59, wherein the proximal orifice 55 and the distal orifice 56 are aligned on a central axis 500 which is, in situation, coincident or substantially coincident with the longitudinal axis 30. More precisely, the nut 59 is secured to the distal plate 52, and this nut 59 is centered on the longitudinal axis 30. The nut 59 is therefore firmly fixed on the distal plate 52, for example by welding.

Furthermore, the proximal stop 4 is adapted to pass inside the proximal orifice 55, and more precisely the proximal stop 4 is adapted to slide inside the proximal tube 54, as shown in FIGS. 10 to 12 and 16 to 18.

The distal plate 52 supports, on an inner face opposite the proximal plate 51, a crown 57 surrounding the proximal orifice 55. The spar 53 has windows 58, for example of triangular shape in the first mounting/dismounting device 11 or of rectangular shape in the second mounting/dismounting device 12. This base 5 is made of a metallic material, and for example of steel, for example by welding of its various components.

Figure 9:
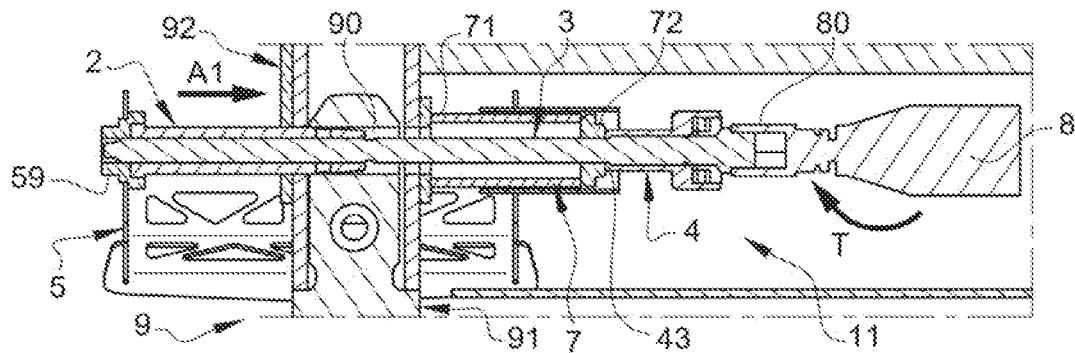
FIG. 9 is a schematic axial section view of the first mounting/dismounting device, in the mounting configuration and at the beginning of the mounting operation, in position on the structure with the connecting pin to be mounted.
Figure 10:
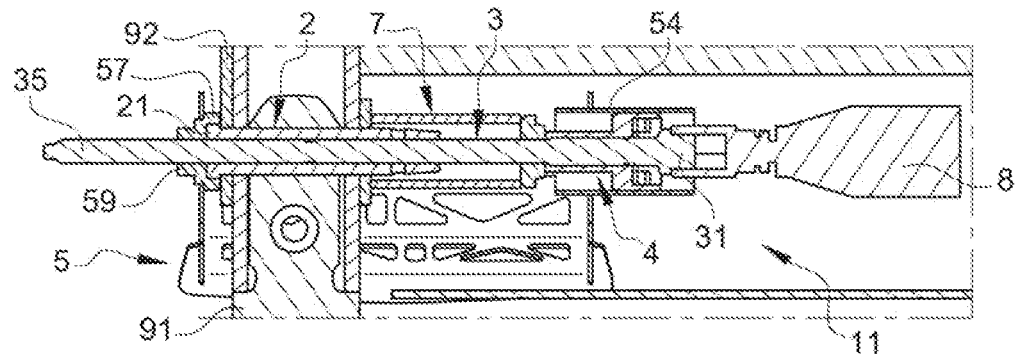
FIG. 10 is a schematic view equivalent to that of FIG. 9, at the end of the mounting operation and with the connecting pin being mounted.
Figure 15:
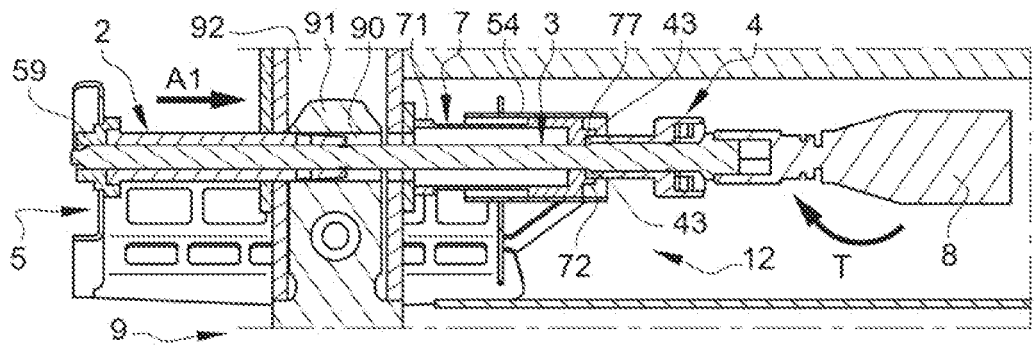
FIG. 15 is a schematic axial section view of the second mounting/dismounting device, in the mounting configuration and at the beginning of the mounting operation, in position on the structure with the connecting pin to be mounted.
Figure 16:
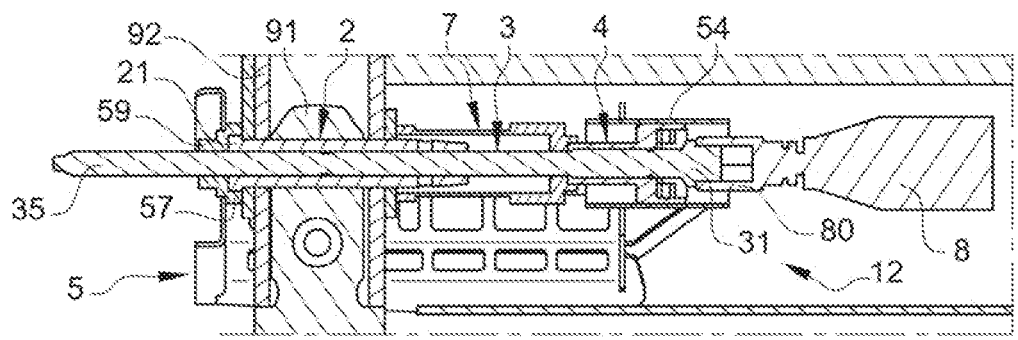
FIG. 16 is a schematic view equivalent to that of FIG. 15, at the end of the mounting operation and with the connecting pin being mounted.

This crown 57 is adapted to receive internally:
  either the enlarged head 21 of the connecting pin 2 in the mounting configuration, as shown in FIGS. 9 and 15;
  or a second open end 72 of a bushing 7 in the dismounting configuration, as will be described hereinbelow.

In position, and as shown in FIGS. 8 to 12 and 15 to 18, the proximal plate 51 is located on the second side of the structure 9 (inner side in the example of FIG. 1) and the distal plate 52 is located on the first side of the structure 9 (external side in the example of FIG. 1) opposite the enlarged head 21 of the connecting pin 2, and the spar 53 extends on either side of the two structure elements 91, 92 between the two sides.

In the third mounting/dismounting device 13, the base 6 comprises a cylindrical support sleeve 60, centered on an axis which is, in position, coincident with the longitudinal axis 30; the axis of the support sleeve 60 will therefore be assimilated for the rest of the description to the longitudinal axis 30. This support sleeve 60 thus forms a tube and has an open proximal end 61 and an open distal end 62 which are opposite to each other. The base 6 also comprises a proximal wall 63, orthogonal to the longitudinal axis 30, and which is secured to the proximal end 61 of the support sleeve 60.

The support sleeve 60 internally supports the nut 69 which is secured to two guide pins 64 extending radially and disposed diametrically opposite with respect to the longitudinal axis 30. Furthermore, the support sleeve 60 has two slots in which the two respective guide pins 64 are engaged, wherein these slots successively define, starting from the proximal end 61 towards the distal end 62:
  a longitudinal groove 651 extending parallel to the longitudinal axis 30;
  a circumferential groove 652 which prolongs the longitudinal groove 651, on the side of the distal end 62 of the support sleeve 60; and
  a locking groove 653 which follows the circumferential groove 652 and which has a generally "L" shape.

Figure 19:
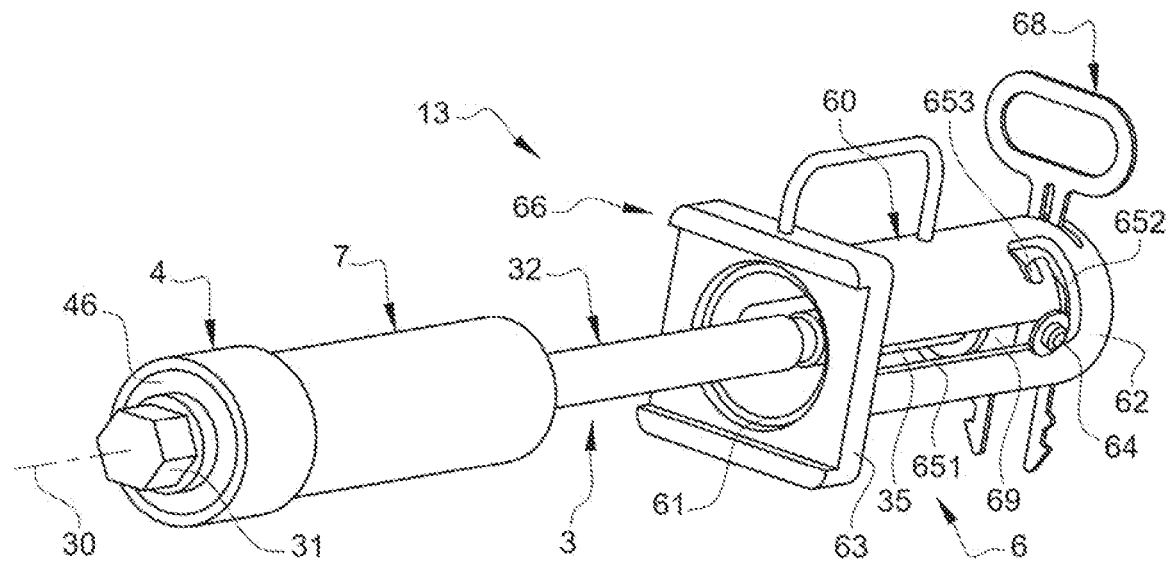
FIG. 19 is a schematic perspective view of a third mounting/dismounting device according to the invention, in the mounting configuration.
Figure 20:
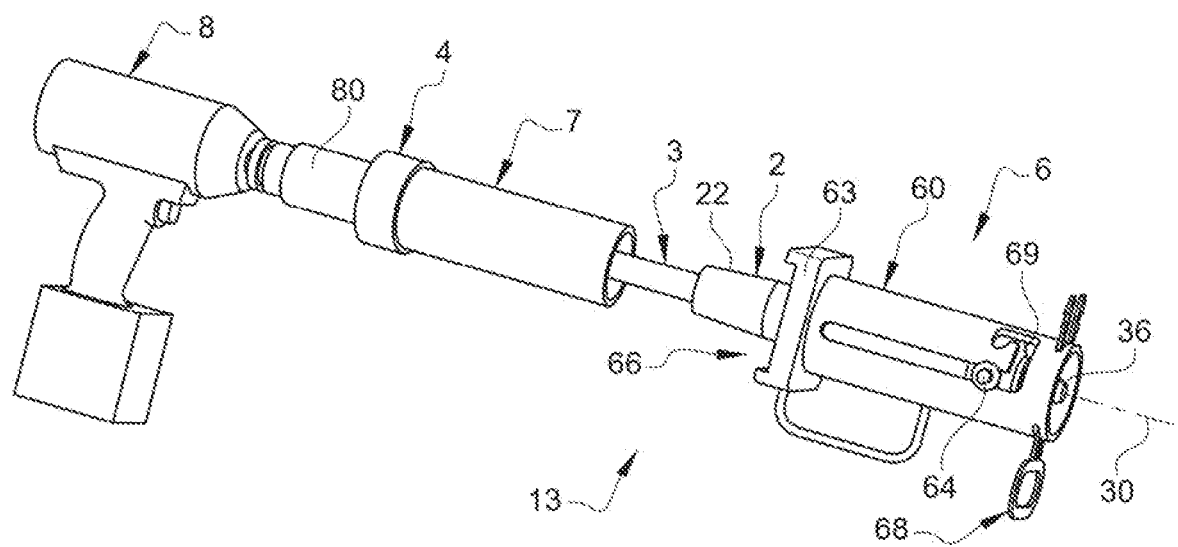
FIG. 20 is a schematic perspective view of the third mounting/dismounting device according to the invention, in the mounting configuration, coupled to a screwdriver.
Figure 21:
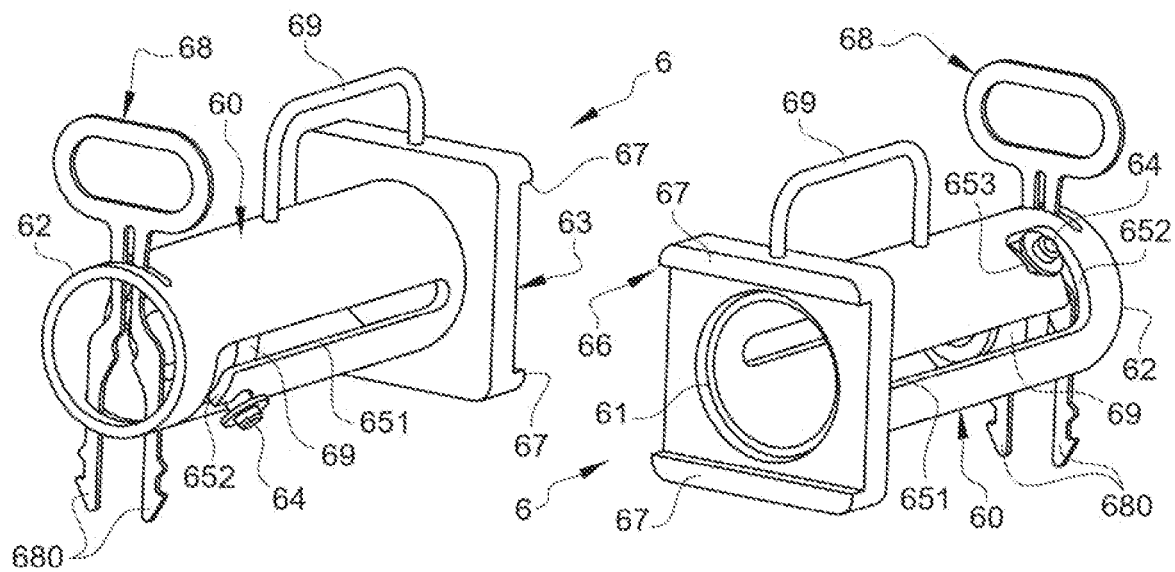
FIG. 21 is a schematic perspective view, from two viewing angles, of a base comprising a support sleeve, for the third mounting/dismounting device.
Figure 22:
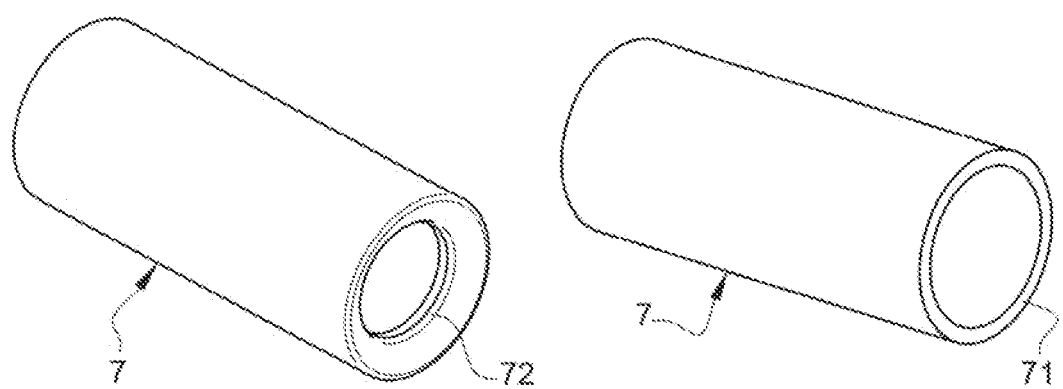
FIG. 22 is a schematic perspective view of a bushing, from two viewing angles, for the third mounting/dismounting device.
Figure 23:
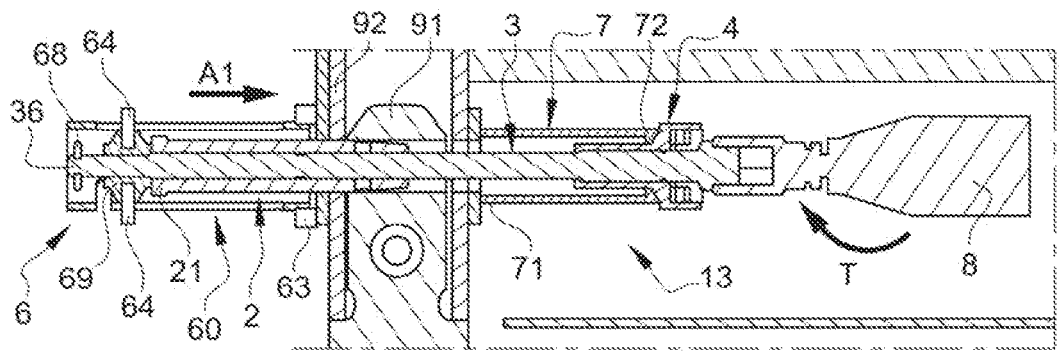
FIG. 23 is a schematic axial section view of the third mounting/dismounting device, in the mounting configuration and at the beginning of the mounting operation, in position on the structure with the connecting pin to be mounted.
Figure 24:
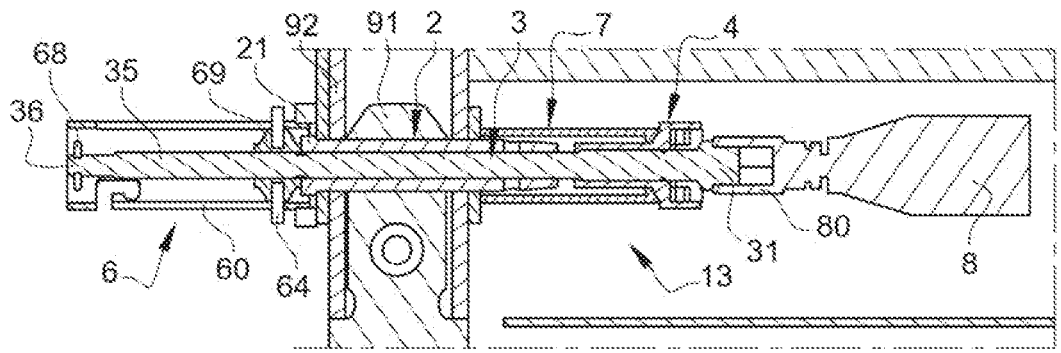
FIG. 24 is a schematic view equivalent to that of FIG. 23, at the end of the mounting operation and with the connecting pin being mounted.
Figure 25:
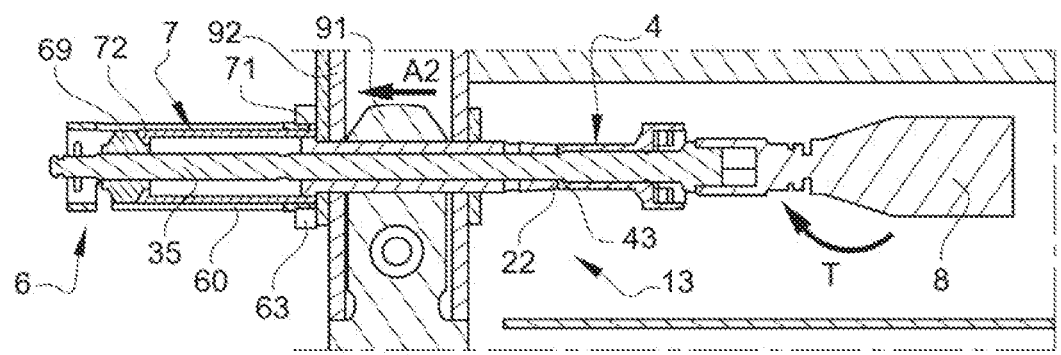
FIG. 25 is a schematic axial section view of the third mounting/dismounting device, in the dismounting configuration and at the beginning of the dismounting operation, in position on the structure with the connecting pin to be dismounted.
Figure 26:
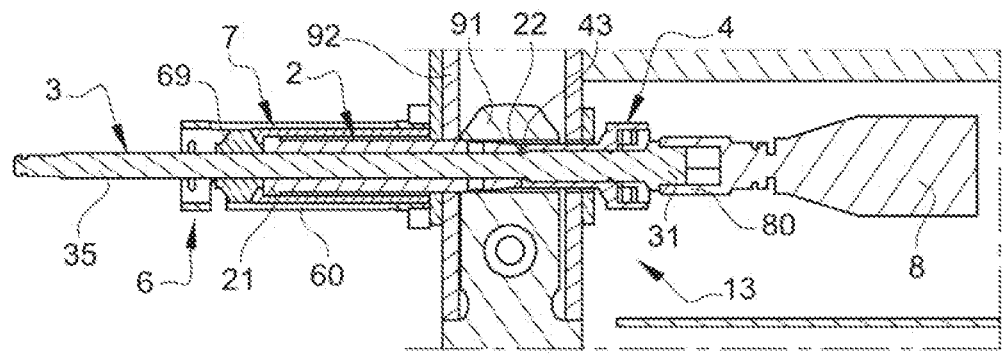
FIG. 26 is a schematic view equivalent to that of FIG. 25, at the end of the dismounting operation and with the connecting pin being partially dismounted.

Thus, two positions are possible for the nut 69 and the guide pins 64 depending on the configuration of the third mounting/dismounting device 13:
  in the mounting configuration, shown in FIGS. 19 and 20, the guide pins 64 are engaged in the corresponding longitudinal grooves 651, so that the nut 69 is blocked in rotation around the longitudinal axis 30 and is guided in translation along the longitudinal axis 30;
  in the dismounting configuration, shown in FIG. 21, the guide pins 64 are engaged in the corresponding locking grooves 653, so that the nut 69 is locked in rotation around the longitudinal axis 30 and is blocked in translation along the longitudinal axis 30.

The nut 69 passes from the mounting configuration to the dismounting configuration, and vice versa, by causing the guide pins 64 to pass from the longitudinal grooves 651 to the locking grooves 653, and vice versa, via the circumferential grooves 652.

The proximal wall 63 has a bearing relief 66 which forms the abutment portion shaped to bear on one of the two frame elements 91, 92 and ensure rotational forces take-up. This bearing relief 66 has a shape that is complementary to that of one of the two frame elements 91, 92, and in the example illustrated this bearing relief 66 is in the form of two linear stops 67 facing each other, delimiting therebetween a notch into which the proximal end 61 of the support sleeve 60 opens.

Although not shown, it is possible to provide one or several magnets arranged on the bearing relief 66, for example on the two linear stops 67 facing each other, in order to hold by magnetization the base 6 on one of the two frame elements 91, 92.

The base 6 also comprises a holding system 68 mounted on the distal end 62 of the support sleeve 60 in order to cooperate with the free end 36 of the rod body 32 of the mounting/dismounting rod 3 in the mounting configuration, to axially block the rod body 32 along the longitudinal axis 30. In the illustrated example, the holding system 68 is in the form of a mechanical lock of the holding clip-type, which passes transversely through the support sleeve 60 at its distal end 62, and which has two elastically deformable lugs 680 shaped to be blocked in a circumferential locking recess provided for this purpose on the free end 36 of the rod body 32. In the dismounting configuration, the holding system 68 is removed or moved so as to no longer cooperate with the free end 36 of the rod body 32, and thus leave the rod body 32 free to translate along the longitudinal axis 30 with respect to the support sleeve 60.

A handle 69 can also be secured to the base 6 to be able to manipulate and position it manually. In situation, and as shown in FIGS. 23 to 26, the base 6 is located on the first side of the structure 9 (external side in the example of FIG. 1) with its proximal wall 63 facing the enlarged head 21 of the connecting pin 2.

Each of the mounting/dismounting devices 11, 12, 13 comprises a bushing 7 which is removable and independent of the mounting/dismounting rod 3, of the proximal stop 4 and of the base 5, 6. In situation, this bushing 7 is mounted free in translation along the longitudinal axis 30 around the rod body 32, between the nut 59, 69 and the proximal stop 4.

The bushing 7, of a generally cylindrical shape, has a first open end 71 and a second open end 72. The first open end 71 has an opening diameter greater than that of the second open end 72. Furthermore, the first open end 71 is sized to allow the passage of the enlarged head 21 of the connecting pin 2, which allows the connecting pin 2 to enter at least partially inside the bushing 7 through its first open end 71, whether in a first direction of insertion with the proximal end 22 of the connecting pin 2 which enters the first open end 71 of the bushing 7 (as shown in FIGS. 9, 10, 15, 16, 23 and 24 during a mounting phase), and also according to a second direction of insertion with the distal end and the enlarged head 21 of the connecting pin 2 which enter the first open end 71 of the bushing 7 (as shown in FIGS. 11, 12, 17, 18, 25 and 26 during a dismounting phase).

Two positions of the bushing 7 are possible depending on the configuration of the mounting/dismounting device 11, 12, 13:
  in the mounting configuration, visible in FIGS. 9, 10, 15, 16, 19, 20, 23 and 24, the bushing 7 is in abutment against the proximal stop 4 and more precisely the second open end 72 of the bushing 7 is placed in abutment against the proximal stop 4;
  in the dismounting configuration, shown in FIGS. 2, 3, 11, 12, 14, 17, 18, 25 and 26, the bushing 7 is in abutment against the nut 59, 69 and more precisely the second open end 72 of the bushing 7 is placed in abutment against the nut 59, 69.

In situation, once the mounting/dismounting device 11, 12, 13 is in place on the structure 9:
  in the mounting configuration, the bushing 7 is located on the second side of the structure 9, interposed between the proximal stop 4 and one of the two structural elements 91, 92, and wherein the first open end 71 of the bushing 7 bears against one of the two frame elements 91, 92 on the second side of the structure 9, the first open end 71 of the bushing 7 being ready to receive the connecting pin 2 internally;
  in the dismounting configuration, the bushing 7 is located on the first side of the structure 9, interposed between the nut 59, 69 and one of the two frame elements 91, 92, and wherein the first open end 71 of the bushing 7 bears against one of the two frame elements 91, 92 on the first side of the structure 9, the first open end 71 of the bushing 7 surrounding the enlarged head 21 of the connecting pin 2 and being ready to receive the connecting pin 2 internally.

There are differences between the bushings 7 of the various mounting/dismounting devices 11, 12, 13.

In the first mounting/dismounting device 11 and in the second mounting/dismounting device 12, the bushing 7 has an outer diameter such that the bushing 7 is adapted to pass inside the proximal orifice 55 of the cradle 50 of the base 5, and more precisely the bushing 7 is adapted to slide inside the proximal tube 54, as shown in FIGS. 9 and 15.

Figure 2:
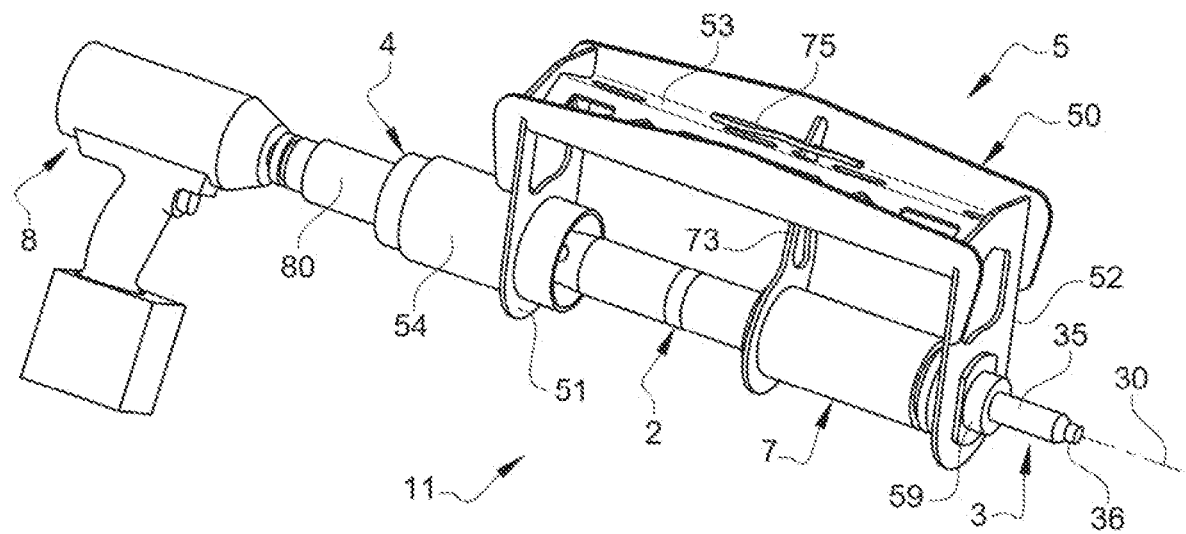
FIG. 2 is a schematic perspective view of a first mounting/dismounting device according to the invention, in the dismounting configuration, coupled to a screwdriver.
Figure 3:
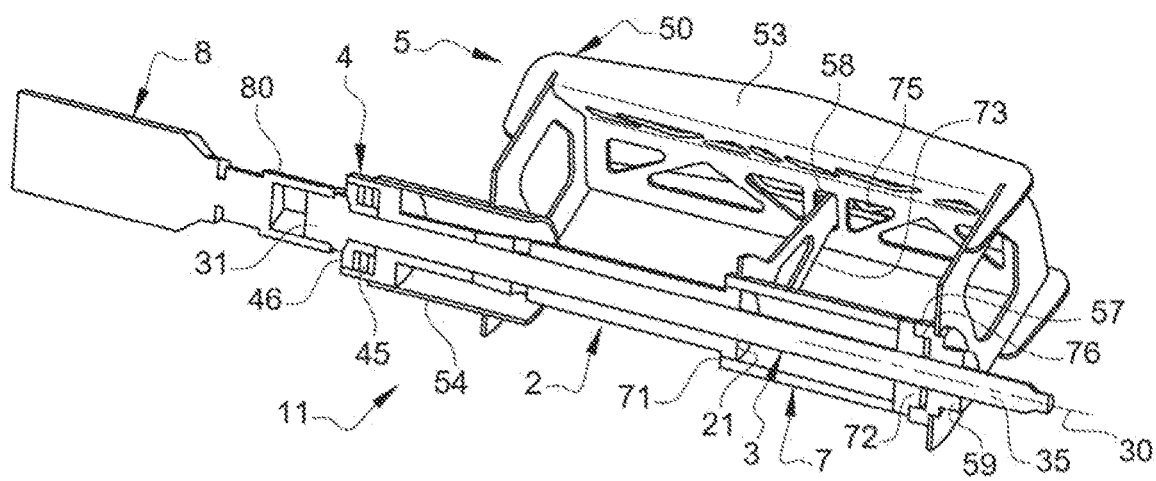
FIG. 3 is a schematic perspective and axial section view of the first mounting/dismounting device, in the dismounting configuration, coupled to the screwdriver.
Figure 4:
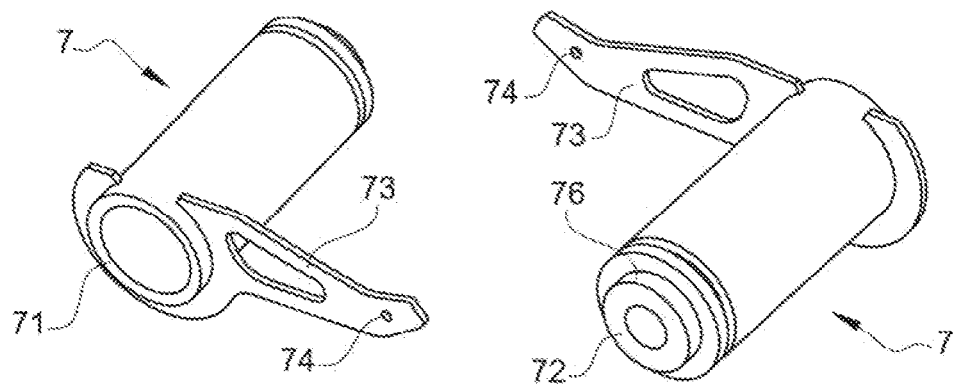
FIG. 4 is a schematic perspective view of a bushing, from two viewing angles, for the first mounting/dismounting device.
Figure 5:
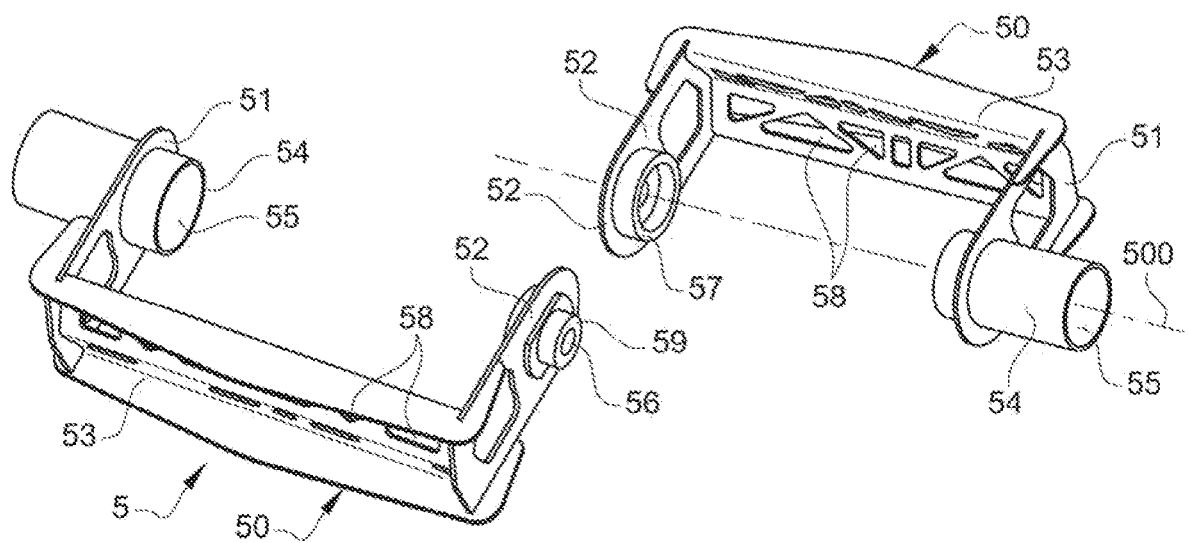
FIG. 5 is a schematic perspective view, from two viewing angles, of a base made in the form of a cradle for the first mounting/dismounting device.
Figure 14:
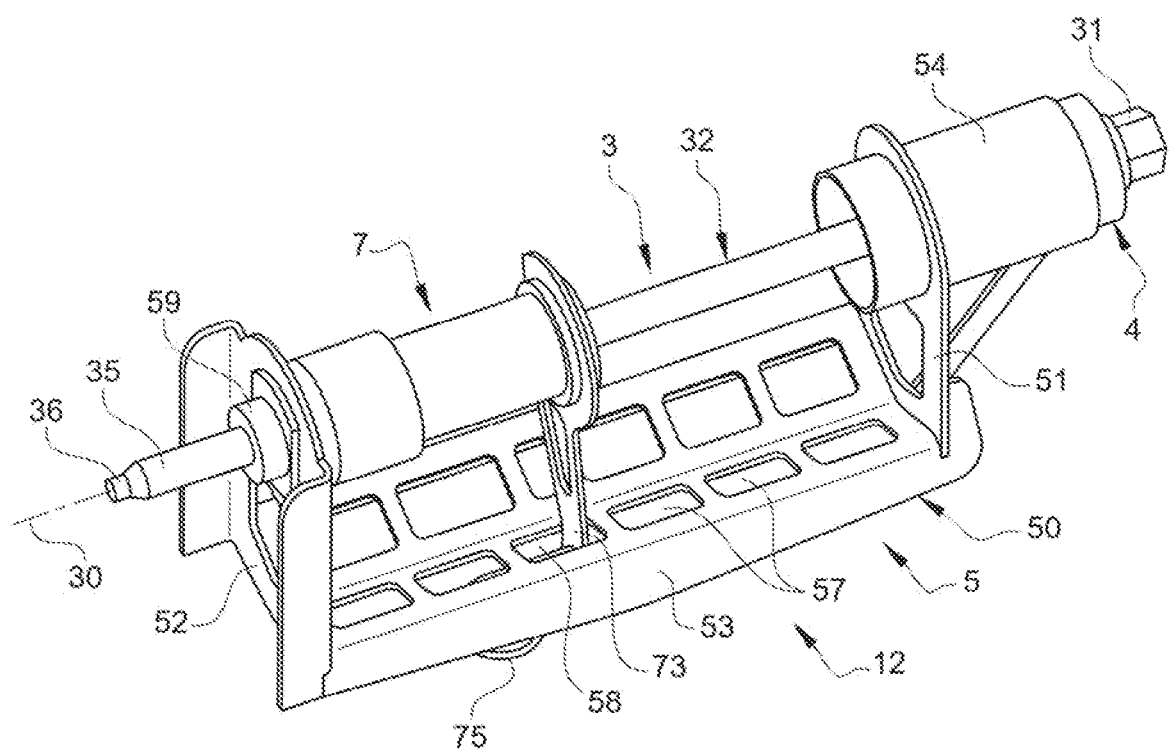
FIG. 14 is a schematic perspective view of a second mounting/dismounting device according to the invention, in the dismounting configuration.

In the first mounting/dismounting device 11 and in the second mounting/dismounting device 12, the sleeve 7 is secured to a radial extension arm 73 adapted to be engaged in a window 58 made in the spar 53 of the cradle 50, in order to block said bushing 7 in rotation in the dismounting configuration, as shown in FIGS. 2, 3 and 14; this radial extension arm 73 allowing torque to be taken up during dismounting. Advantageously, the radial extension arm 73 is provided with a free end having a hole 74 in which is engaged a locking member 75, of the pin type, to lock the radial extension arm 73 in the window 58 of the spar 50, and thus avoid the fall of the bushing 7 during a dismounting phase. In the third mounting/dismounting device 13, the bushing 7 does not have such a radial extension arm.

Figure 11:
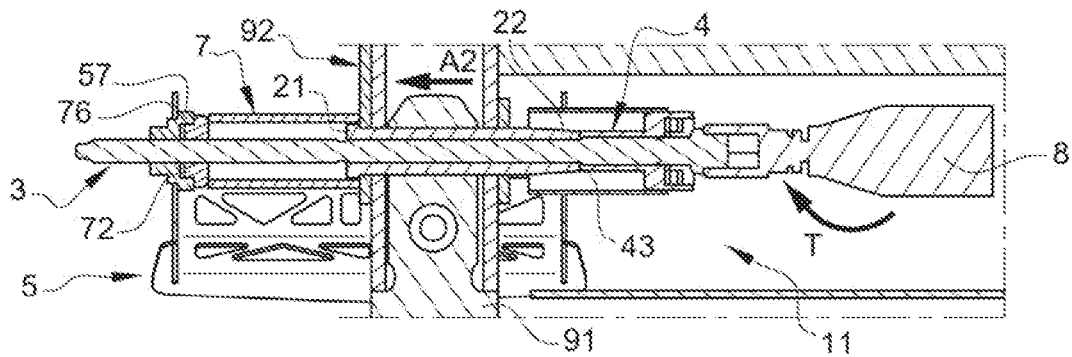
FIG. 11 is a schematic axial section view of the first mounting/dismounting device, in the dismounting configuration and at the beginning of the dismounting operation, in position on the structure with the connecting pin to be dismounted.
Figure 12:
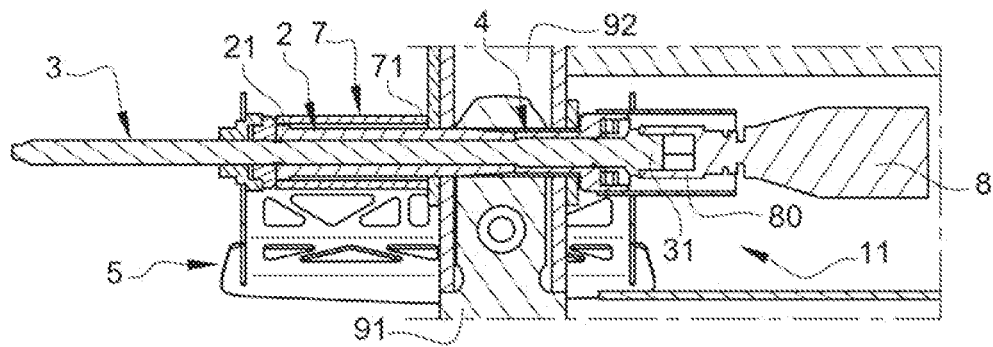
FIG. 12 is a schematic view equivalent to that of FIG. 11, at the end of the dismounting operation and with the connecting pin being partially dismounted.
Figure 17:
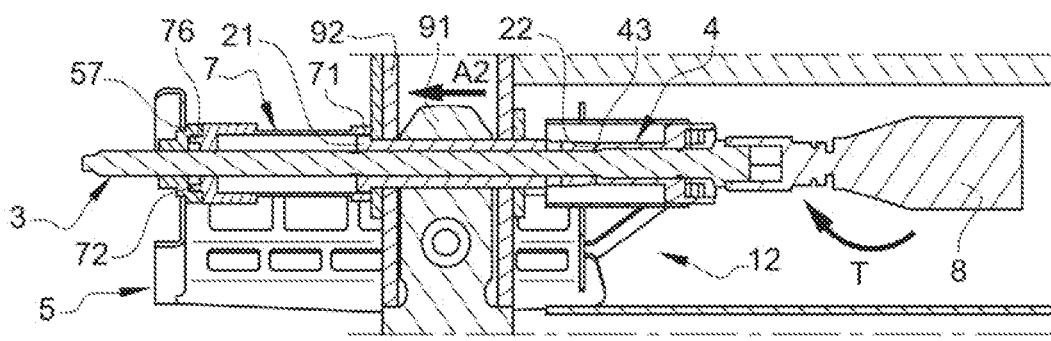
FIG. 17 is a schematic axial section view of the second mounting/dismounting device, in the dismounting configuration and at the beginning of the dismounting operation, in position on the structure with the connecting pin to be dismounted.
Figure 18:
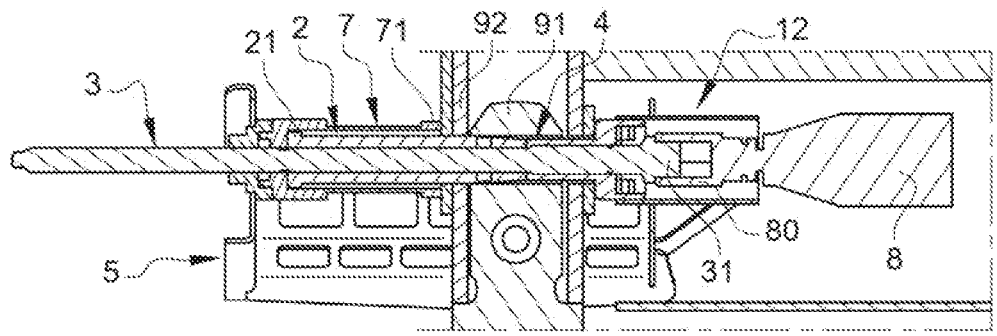
FIG. 18 is a schematic view equivalent to that of FIG. 17, at the end of the dismounting operation and with the connecting pin being partially dismounted.

In the first mounting/dismounting device 11 and in the second mounting/dismounting device 12, the second open end 72 of the bushing 7 has an external bearing 76 shaped to be internally received in the crown 57 provided on the proximal plate 51 of the base 5, in the dismounting configuration, as shown in FIGS. 3, 11 and 17.

In the second mounting/dismounting device 12, the second open end 72 of the bushing 7 has an internal bearing 77, surrounded by the external bearing 76, provided to internally receive the distal end 43 of the proximal stop 4 in the mounting configuration, as shown in FIG. 15; this distal end 43 abuts against the second open end 72. This internal bearing 77 thus makes it possible to guide or center the proximal stop 4 on the bushing 7. In the first mounting/dismounting device 11, the bushing 7 does not have such an internal bearing, the distal end 43 of the proximal stop 4 abuts against the second open end 72 without being received in such an internal bearing.

In the first mounting/dismounting device 11 and in the second mounting/dismounting device 12, the second open end 72 of the bushing 7 is dimensioned so that, in the mounting configuration, this second open end 72 is in abutment against the distal section 42 of the proximal stop 4. In the third mounting/dismounting device 13, the second open end 72 of the bushing 7 is dimensioned so that, in the mounting configuration, this second open end 72 is in abutment against the proximal section 41 of the proximal stop 4.

The rest of the description relates to the mounting method for mounting the connecting pin 2, with reference to FIGS. 9, 10, 15, 16, 23 and 24.

Initially, the connecting pin 2 is positioned, on the first side of the structure 9, in the connecting hole 90 passing through the two superimposed frame elements 91, 92, its enlarged head 21 being at a distance from the two frame elements 91, 92.

Then, the bushing 7 is mounted around the mounting/dismounting rod 3, bringing its second open end 72 into abutment against the proximal stop 4.

The base 5, 6 is placed on the structure 9 with the nut 59, 69 being disposed on the first side of the structure 9 in alignment with the main axis 20 of the connecting pin (therefore ultimately with the longitudinal axis 30), and the enlarged head 21 of the connecting pin 2 is placed in abutment against the base 5, 6.

With the first mounting/dismounting device 11 and the second mounting/dismounting device 12, the base 5 bears on the enlarged head 21, by engaging the crown 57 around the enlarged head 21, which allows centering the base 5. With the third mounting/dismounting device 13, the base 6 also bears on the enlarged head 21, by engaging the support sleeve 60 around the enlarged head 21, which allows the base 6 to be held in place.

Then the mounting/dismounting rod 3 is pressed and passes through the two frame elements 91, 92 and the connecting pin 2 until the threaded distal portion 35 comes into contact with the nut 59, 69 supported by the base 5, 6, and the bushing 7 bears against one of the two frame elements on the second side of the structure 9.

With the first mounting/dismounting device 11 and the second mounting/dismounting device 12, it is possible to position the bushing 7 inside the proximal tube 54, before inserting the mounting/dismounting rod 3 which will thus pass through the bushing 7 until the latter is in abutment against the proximal stop 7.

The head 31 of the mounting/dismounting rod 3 is coupled to the bit 80 of the screwdriver 8 which is located on the second side of the structure 9, opposite the connecting pin 2. It is possible to make this coupling before or after having inserted the mounting/dismounting rod 3 through the two frame elements 91, 92 and the connecting pin 2.

Then, the screwdriver 8 is activated to rotate the mounting/dismounting rod 3 (as schematically shown by the arrows T in FIGS. 9, 15 and 23) and thus to screw the threaded distal portion 35 into the nut 59, 69, leading to an axial displacement of the nut 59, 69 in a direction from the first side towards the second side of the structure 9 (as schematically shown by the arrows A1 in FIGS. 9, 15 and 23), and therefore also to an axial displacement of the connecting pin 2 (pushed by the nut 59, 69) which is engaged through the two frame elements 91, 92.

During screwing, the abutment portion of the base 5, 6 (whether it is the spar 30 or the bearing relief 66) bears on one of the two frame elements 91, 92 in order to block the base 5, 6 and the nut 59, 69 in rotation around the longitudinal axis 30, this abutment portion thus ensuring the torque take-up.

With the third mounting/dismounting device 13, the screwdriver 8 is activated so that the free end 36 of the mounting/dismounting rod 3 may come to face the holding system 68, then the screwdriver 8 is deactivated while the holding system 68 is set up to cooperate with this free end 36 in order to axially block the mounting/dismounting rod 3 along the longitudinal axis 30. And then the screwdriver 8 is reactivated to finish screwing.

Finally, once the enlarged head 21 of the connecting pin 2 is in abutment against one of the two frame elements 91, 92 (therefore once the connecting pin 2 is mounted), the screwdriver 2 is activated in the opposite direction to unscrew the threaded distal portion 35 from the nut 59, 69 and then to remove the mounting/dismounting device 11, 12, 13.

The rest of the description relates to the dismounting method for dismounting the connecting pin 2, with reference to FIGS. 11, 12, 17, 18, 25 and 26.

Initially, the connecting pin 2 is mounted, so that the latter is mounted in the connecting hole 90 passing through the two superimposed frame elements 91, 92, its enlarged head 21 being in abutment on one of the two frame elements 91, 92 on the first side of the structure 9.

The base 5, 6 is placed on the structure 9 with the nut 59, 69 being disposed on the first side of the structure 9 in alignment with the main axis 20 of the connecting pin (therefore ultimately with the longitudinal axis 30), and with the bushing 7 which is mounted on the base 5, 6, on the first side of the structure 9, and which is interposed between the nut 59, 69 and one of the two frame elements 91, 92, the first open end 71 of the bushing 7 surrounding the enlarged head 21 of the connecting pin 2.

With the first mounting/dismounting device 11 and the second mounting/dismounting device 12, the bushing 7 bears on the enlarged head 21, having its first open end 71 engaged in an adjusted manner around the enlarged head 21, and the base 5 bears on the second open end 72 of the bushing 7 with its crown 57 being engaged in an adjusted manner around the external bearing 76, which allows centering of the base 5 and the bushing 7. With the third mounting/dismounting device 13, the bushing 7 bears on the enlarged head 21, having its first open end 71 engaged in an adjusted manner around the enlarged head 21, and the support sleeve 60 is mounted in an adjusted manner around the bushing 7, which also allows centering the base 6 and the bushing 7.

Then, the mounting/dismounting rod 3 is pressed and passes through the connecting pin 2, entering the latter at the level of its proximal end 22, and passes through the bushing 7 until the threaded distal portion 35 comes into contact with the nut 59, 69.

The head 31 of the mounting/dismounting rod 3 is coupled to the bit 80 of the screwdriver 8 which is located on the second side of the structure 9, opposite the connecting pin 2. It is possible to make this coupling before or after having inserted the mounting/dismounting rod 3 through the connecting pin 2.

Then, the screwdriver 8 is activated to rotate the mounting/dismounting rod 3 (as schematically shown by the arrows T in FIGS. 11, 17 and 25) and thus to screw the threaded distal portion 35 into the nut 59, 69, leading to an axial displacement of the proximal stop 4 which comes into abutment against the proximal end 22 of the connecting pin 2, thus pushing the connecting pin 2 axially in a direction from the second side towards the first side of the structure (as schematically shown by the arrows A2 in FIGS. 11, 17 and 25), so that the connecting pin 2 comes out at least partially from the two frame elements 91, 92 while entering inside the bushing 7.

Finally, once the proximal stop 4 is in abutment against one of the two frame elements 91, 92, the screwdriver 8 is activated in the opposite direction to unscrew the threaded distal portion 35 from the nut 59, 69 and then remove the mounting/dismounting device 11, 12, 13. Upon completion of these operations, the connecting pin 2 has come out sufficiently from the connecting hole 90, to be able to easily finish pulling it out completely, in particular by hand.

Figure 13:
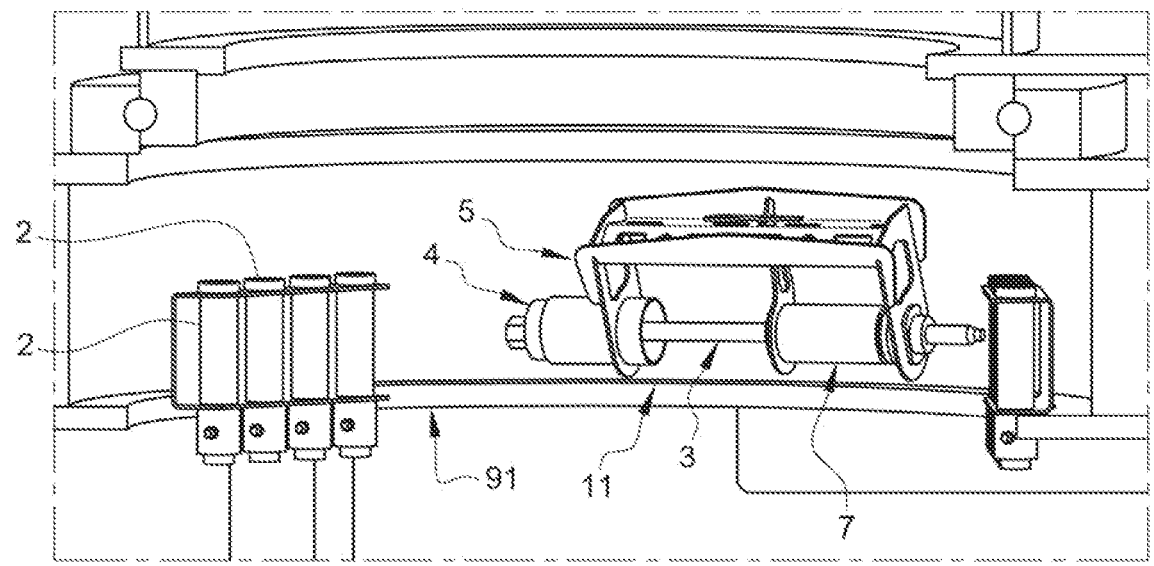
FIG. 13 is a schematic perspective view of the first mounting/dismounting device which is stored on the underside of the fixed pivot element of the crane structure of FIG. 1, with several connecting pins.

Finally, it should be noted that, as illustrated in FIG. 13, the mounting/dismounting device 11, 12 or 13, can be stored, with one or several connecting pins 2, on one of the two frame elements 91, 92, and for example on the frame element 92 which constitutes a portion forming a fixed pivot, in order to prevent the fitter from moving with the mounting/dismounting device and with the required connecting pin(s) 2; the fitter only having to carry the screwdriver 8.

The invention claimed is:

1. A mounting/dismounting device for mounting/dismounting a connecting pin used for an end-to-end assembly of two frame elements of a crane structure, the mounting/dismounting device comprising:
   a mounting/dismounting rod having a longitudinal axis, a head adapted to cooperate with a screwdriver, and a rod body having a proximal portion prolonging the head and a threaded distal portion which terminates in a free end;
   a base supporting a nut and having an abutment shaped to bear on one of the two frame elements, the threaded distal portion being provided to screw into the nut aligned with the longitudinal axis;
   a proximal stop mounted freely in rotation on the proximal portion of the rod body around the longitudinal axis;
   a bushing which is removable and mounted freely in translation along the longitudinal axis around the rod body between the nut and the proximal stop, the bushing having a first open end and a second open end;

wherein the mounting/dismounting device is configurable in:
a mounting configuration in which the bushing is in abutment against the proximal stop; and
a dismounting configuration in which the bushing is in abutment against the base or the nut.

2. The mounting/dismounting device according to claim 1, wherein the base comprises a support sleeve aligned with the longitudinal axis and having an open proximal end and a opposite open distal end, the support sleeve internally supporting the nut, wherein:
in the mounting configuration, the nut is blocked in rotation and is guided in translation along the longitudinal axis; and
in the dismounting configuration, the nut is blocked in rotation and is blocked in translation along the longitudinal axis.

3. The mounting/dismounting device according to claim 2, wherein at least one longitudinal groove is provided on the support sleeve, the longitudinal groove extending parallel to the longitudinal axis, and the nut is secured to at least one guide pin which, in the mounting configuration, is engaged in the corresponding longitudinal groove to block the nut in rotation and guide the nut in translation along the longitudinal axis.

4. The mounting/dismounting device according to claim 3, wherein the at least one longitudinal groove is extended, on a side of the open distal end of the support sleeve, by a circumferential groove which is followed by a locking groove having an "L" shape so that, in the dismounting configuration, the at least one guide pin is engaged in the locking groove to block the nut in rotation and in translation along the longitudinal axis.

5. The mounting/dismounting device according to claim 2, wherein the base comprises a proximal wall, secured to the proximal end of the support sleeve, the proximal wall having a bearing relief which forms the abutment shaped to bear on one of the two frame elements.

6. The mounting/dismounting device according to claim 5, wherein the bearing relief is in the form of two linear stops facing each other, delimiting therebetween a notch into which opens the proximal end of the support sleeve.

7. The mounting/dismounting device according to claim 2, wherein the base comprises a mechanical lock mounted on the distal end of the support sleeve and cooperating with the free end of the rod body of the mounting/dismounting rod in the mounting configuration, in order to axially block the rod body along the longitudinal axis.

8. The mounting/dismounting device according to claim 2, wherein the base comprises one or several magnets disposed on the abutment to hold by magnetization the base on one of the two frame elements.

9. The mounting/dismounting device according to claim 1, wherein the base comprises a cradle having an arched shape and provided with a proximal plate and a distal plate facing each other and connected by a spar, the spar forming the abutment shaped to bear on one of the two frame elements.

10. The mounting/dismounting device according to claim 9, wherein the proximal plate and the distal plate respectively comprise a proximal orifice and a distal orifice aligned with the longitudinal axis, the distal orifice being secured to the nut, and wherein the proximal stop and the bushing are adapted to pass inside the proximal orifice of the cradle.

11. The mounting/dismounting device according to claim 10, wherein the proximal plate of the cradle supports a proximal tube internally defining the proximal orifice, the proximal stop and the bushing are adapted to slide inside the proximal tube.

12. The mounting/dismounting device according to claim 10, wherein the distal plate supports, on an inner face facing the proximal plate, a crown surrounding the distal orifice and which is adapted to receive internally either an enlarged head of the connecting pin in the mounting configuration, or the second open end of the bushing in the dismounting configuration.

13. The mounting/dismounting device according to claim 9, wherein the bushing is secured to a radial extension arm adapted to be engaged into a window formed in the spar of the cradle, in order to block the bushing in rotation in the dismounting configuration.

14. The mounting/dismounting device according to claim 13, wherein the radial extension arm is provided with a free end cooperating with a locking pin, to lock the radial extension arm in the window of the spar.

15. The mounting/dismounting device according to claim 1, wherein the proximal stop is blocked in translation along the proximal portion of the rod body, against the head of the mounting/dismounting rod.

16. The mounting/dismounting device according to claim 15, wherein the proximal portion of the rod body has a circumferential recess, and the proximal stop is blocked in translation by means of two pins which pass through the proximal stop to be engaged in the circumferential recess in a diametrically opposite manner with respect to the longitudinal axis.

17. The mounting/dismounting device according to claim 1, wherein the proximal stop is guided in rotation by a running gear mounted around the proximal portion of the rod body.

18. The mounting/dismounting device according to claim 17, wherein the running gear is interposed between an annular stop, which bears against the head of the mounting/dismounting rod, and an inner shoulder provided in the proximal stop.

19. The mounting/dismounting device according to claim 18, wherein the annular stop has a concave rear face of hemispherical shape and which bears on a hemispherical bearing surface of the head of the mounting/dismounting rod.

20. A mounting/dismounting system for mounting/dismounting a connecting pin used for an end-to-end assembly of two frame elements of a crane structure, the mounting/dismounting system comprising:
a mounting/dismounting device according to claim 1; and
a screwdriver provided with a bit capable of cooperating with the head of the mounting/dismounting rod, in order to be able to rotatably drive the mounting/dismounting rod.

21. An assembly kit for an end-to-end assembly of two frame elements of a crane structure, the assembly kit comprising:
a mounting/dismounting device according to claim 1; and
at least one connecting pin adapted to pass through a connecting hole passing through the two frame elements;
wherein the connecting pin has a tubular shape so that the mounting/dismounting rod can pass through it, and the connecting pin has a distal end provided with an enlarged head and a proximal end, which are opposite to each other.

22. The assembly kit according to claim 21, wherein the first open end of the bushing is sized to allow the connecting pin to enter at least partially inside said bushing, according to a first direction of insertion with the proximal end of the connecting pin which enters the first open end of the bushing, and also according to a second direction of insertion with the distal end and enlarged head of the connecting pin entering the first open end of the bushing.

23. A mounting method for mounting a connecting pin used for an end-to-end assembly of two frame elements of a crane structure, the mounting method comprising:

provparing the mounting/dismounting device of claim 1;

positioning the connecting pin, of tubular shape, in a connecting hole passing through the two frame elements, and the connecting pin has a distal end provided with an enlarged head and a proximal end which are opposite to each other, the enlarged head being disposed on a first side of the structure;

mounting the bushing around the rod body, on a second side of the structure, opposite to the first side of the structure, with the second open end which is placed in abutment against the proximal stop;

setting up the base on the structure with the nut disposed on the first side of the structure in alignment with the connecting pin, the enlarged head of which is placed in abutment against the nut or the base;

pressing and passing the mounting/dismounting rod through the two frame elements and the connecting pin until the threaded distal portion comes into contact with the nut supported by the base, and the bushing bears against one of the two frame elements on the second side of the structure;

coupling the head of the mounting/dismounting rod to a bit of a screwdriver, which is located on the second side of the structure;

activating the screwdriver to screw the threaded distal portion into the nut, leading to an axial displacement of the nut in a direction from the first side towards the second side of the structure, and therefore also to an axial displacement of the connecting pin which is engaged through the two frame elements, and wherein during screwing the abutment of the base bears on one of the two frame elements in order to block the base and the nut in rotation; and once the enlarged head of the connecting pin is in abutment against one of the two frame elements, activating the screwdriver in the opposite direction to unscrew the threaded distal portion out of the nut and then remove the mounting/dismounting device.

24. A dismounting method for dismounting a connecting pin used for an end-to-end assembly of two frame elements of a crane structure, the dismounting method comprising:

providing the mounting/dismounting device of claim 1;

mounting the connecting pin, of tubular shape, through the two frame elements in order to assemble them, and the connecting pin has a distal end provided with an enlarged head and a proximal end which are opposite to each other, the enlarged head being disposed on a first side of the structure;

setting up the base on the structure with the nut being disposed on the first side of the structure in alignment with the connecting pin, and with the bushing which is mounted on the base, on the first side of the structure, and which is interposed between the nut and one of the two frame elements, the first open end of the bushing surrounding the enlarged head of the connecting pin;

pressing and passing the mounting/dismounting rod through the connecting pin and the bushing until the threaded distal portion comes into contact with the nut;

coupling the head of the mounting/dismounting rod to a bit of a screwdriver, which is located on a second side of the structure, opposite the first side of the structure;

activating the screwdriver to screw the threaded distal portion into the nut, leading to an axial displacement of the proximal stop which comes into abutment against the proximal end of the connecting pin, thus pushing the connecting pin axially in a direction from the second side towards the first side of the structure, so that the connecting pin comes out at least partially from the two frame elements while entering inside the bushing; and once the proximal stop is in abutment against one of the two frame elements, activating the screwdriver in the opposite direction to unscrew the threaded distal portion from the nut and then remove the mounting/dismounting device.

* * * * *